(12) United States Patent
Buckler (10) Patent No.: US 8,370,933 B1
(45) Date of Patent: Feb. 5, 2013

(54) SYSTEMS AND METHODS FOR DETECTING THE INSERTION OF POISONED DNS SERVER ADDRESSES INTO DHCP SERVERS

(75) Inventor: Daniel Buckler, Soquel, CA (US)

(73) Assignee: Symantec Corporation, Mountain View, CA (US)

( * ) Notice: Subject to any disclaimer, the term of this patent is extended or adjusted under 35 U.S.C. 154(b) by 558 days.

(21) Appl. No.: 12/624,480

(22) Filed: Nov. 24, 2009

(51) Int. Cl.
*G06F 21/00* (2006.01)

(52) U.S. Cl. .............. 726/22; 726/2; 709/223; 709/230

(58) Field of Classification Search .................. None
See application file for complete search history.

(56) References Cited

U.S. PATENT DOCUMENTS

| | | | | |
|---|---|---|---|---|
| 6,393,484 | B1* | 5/2002 | Massarani | 709/227 |
| 7,496,095 | B1* | 2/2009 | Davis | 370/392 |
| 7,542,468 | B1* | 6/2009 | Begley et al. | 370/389 |
| 2004/0120260 | A1* | 6/2004 | Bernier et al. | 370/252 |
| 2005/0025129 | A1* | 2/2005 | Meier | 370/352 |
| 2006/0209818 | A1* | 9/2006 | Purser | 370/389 |
| 2007/0214232 | A1* | 9/2007 | Belimpasakis et al. | 709/217 |
| 2007/0261112 | A1* | 11/2007 | Todd et al. | 726/11 |
| 2008/0060054 | A1* | 3/2008 | Srivastava | 726/2 |
| 2009/0217350 | A1* | 8/2009 | Manning et al. | 726/3 |
| 2010/0121981 | A1* | 5/2010 | Drako | 709/245 |
| 2010/0290353 | A1* | 11/2010 | Barford et al. | 370/252 |
| 2011/0252120 | A1* | 10/2011 | Flinta et al. | 709/221 |

OTHER PUBLICATIONS

Cisco, "DHCP Secured IP Address Assignment", Cisco IOS Release 12.2(15)T, 2003, pp. 1-14.*
Tulloch, M., "DHCP Server Security (Part I)", WindowSecurity.com, Jul. 20, 2004, URL: http://www.windowsecurity.com/articles/dhcp-security-part1.html.*
Tulloch, M., "DHCP Server Security (Part II)", WindowSecurity.com, Jul. 27, 2004, URL: http://www.windowsecurity.com/articles/DHCP-Security-Part2.html.*
Sharma, N., "Securing Your Network Using Microsoft Windows DHCP", Nov. 1, 2006, URL: http://msmvps.com/blogs/systmprog/archive/2006/11/01/Securing-your-network-using-Microsoft-Windows-DHCP.aspx.*
"Default Password List"; http://www.defaultpassword.com; Last updated Aug. 22, 2006.
"Providing a Safer and Faster Internet"; http://www.opendns.com; Taken from site on Sep. 17, 2009.
DNSstuff.com; http://www.dnsstuff.com; Taken from site on Sep. 17, 2009.

* cited by examiner

*Primary Examiner* — Philip Chea
*Assistant Examiner* — Dorianne Alvarado David
(74) *Attorney, Agent, or Firm* — Advantedge Law Group (57) ABSTRACT

A computer-implemented method for detecting the insertion of poisoned DNS server addresses into DHCP servers may include: 1) identifying a DNS server address provided by a DHCP server, 2) determining that the DNS server address provided by the DHCP server differs from a prior DNS server address provided by the DHCP server, 3) determining, due at least in part to the DNS server address differing from the prior DNS server address, that a DNS server located at the DNS server address provided by the DHCP server represents a potential security risk, and then 4) performing a security operation in an attempt to remedy the potential security risk.

20 Claims, 6 Drawing Sheets

SYSTEMS AND METHODS FOR DETECTING THE INSERTION OF POISONED DNS SERVER ADDRESSES INTO DHCP SERVERS

BACKGROUND

The Domain Name System (DNS) is a hierarchical naming system for computing resources connected to the Internet. Among other tasks, the DNS translates domain names meaningful to humans (such as "www.example.com") into numerical identifiers associated with computing resources (such as "208.77.188.166") in order to address and locate these resources worldwide.

In recent years, malicious programmers have begun exploiting various Internet browser flaws in an effort to redirect domain name resolution requests to compromised ("poisoned") or rogue DNS servers. For example, when an unsuspecting user of a computing device visits a website controlled or compromised by a malicious programmer, the website may invoke a cross-site scripting attack that attempts to insert the address of a poisoned or rogue DNS server into the user's gateway device (such as the user's firewall, wireless access point, or router). Because residential gateway devices are typically delivered with default passwords in place, and since many users fail to change these default passwords during setup, such cross-site scripting attacks may access the user's gateway device using the device's default login information (obtained, e.g., from various publicly available sources, such as http://www.defaultpassword.com).

Once compromised, the user's gateway device may direct the user's computing device to the poisoned or rogue DNS server. The malicious programmer may then monitor the Internet activity of the user, waiting for the user to visit a website that contains or requires the disclosure of sensitive information (such as banking credentials). Once the user visits a suitable website, the malicious programmer may create a mock website that mirrors the legitimate website in question. The next time the user attempts to access the legitimate website, the malicious programmer may cause the poisoned or rogue DNS server to redirect the user's device to the mock website without the user's knowledge. The malicious programmer may then capture the user's sensitive information (such as banking credentials) without the user's knowledge.

SUMMARY

As will be described in greater detail below, the instant disclosure generally relates to systems and methods for detecting the insertion of poisoned or rogue DNS server addresses into residential Dynamic Host Configuration Protocol ("DHCP") servers. In one example, one or more of the various systems described herein may accomplish such a task by: 1) identifying a DNS server address provided by a DHCP server (such as a residential gateway device), 2) determining that the DNS server address provided by the DHCP server differs from a prior DNS server address provided by the DHCP server, 3) determining, due at least in part to the DNS server address differing from the prior DNS server address, that a DNS server located at the DNS server address provided by the DHCP server represents a potential security risk, and then 4) performing a security operation in an attempt to remedy the potential security risk.

In some examples, the systems described herein may identify the DNS server address provided by the DHCP server by: 1) issuing a DHCP request to the DHCP server (e.g., on a periodic basis) and then 2) receiving, in response to the DHCP request, the DNS server address from the DHCP server. In other examples, the systems described herein may identify the DNS server address provided by the DHCP server by: 1) accessing the DHCP server and then 2) retrieving or extracting the DNS server address from the DHCP server. In these examples, the systems described herein may access the DHCP server using login information provided by a user of the computing device (such as, e.g., a user name and password created by a user of the computing device during initial setup of the DHCP server) and/or using default login information associated with the DHCP server (obtained, e.g., from various publicly available sources).

In some embodiments, the systems described herein may determine that the DNS server located at the DNS server address provided by the DHCP server represents a potential security risk if: 1) the DNS server address is listed on a DNS server blacklist, 2) the DNS server address is not listed on a DNS server whitelist, 3) a communication latency associated with the DNS server exceeds a predetermined threshold (which latency may indicate the presence of third-party observance of IP traffic), and/or 4) a DNS resolver configuration file on the computing device has been modified.

In some examples, the systems described herein may perform the security operation by: 1) preventing the computing device from communicating with the DNS server, 2) deleting the DNS server address from the DHCP server, 3) replacing the DNS server address (stored on, e.g., the computing device and/or the DHCP server) with a legitimate DNS server address, 4) adding the DNS server address to a DNS server blacklist, 5) informing one or more government authorities that the DNS server represents a potential security risk, and/or 6) modifying login information required to access the DHCP server.

As will be explained in greater detail below, by monitoring the DNS server addresses provided by local DHCP servers, the systems and methods described herein may enable endpoint security software to successfully detect the insertion of poisoned DNS server addresses. As such, these systems and methods may protect end users from attacks (such as phishing attempts) that utilize poisoned or rogue DNS servers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for detecting the insertion of poisoned DNS server addresses into DHCP servers. The term "DHCP server," as used herein, generally refers to any type or form of device capable of responding to DHCP requests. Examples of DHCP servers include, without limitation, residential or enterprise gateway devices, such as cable and DSL modems, firewalls, network switches, routers, wireless access points, or the like.

Figure 1:
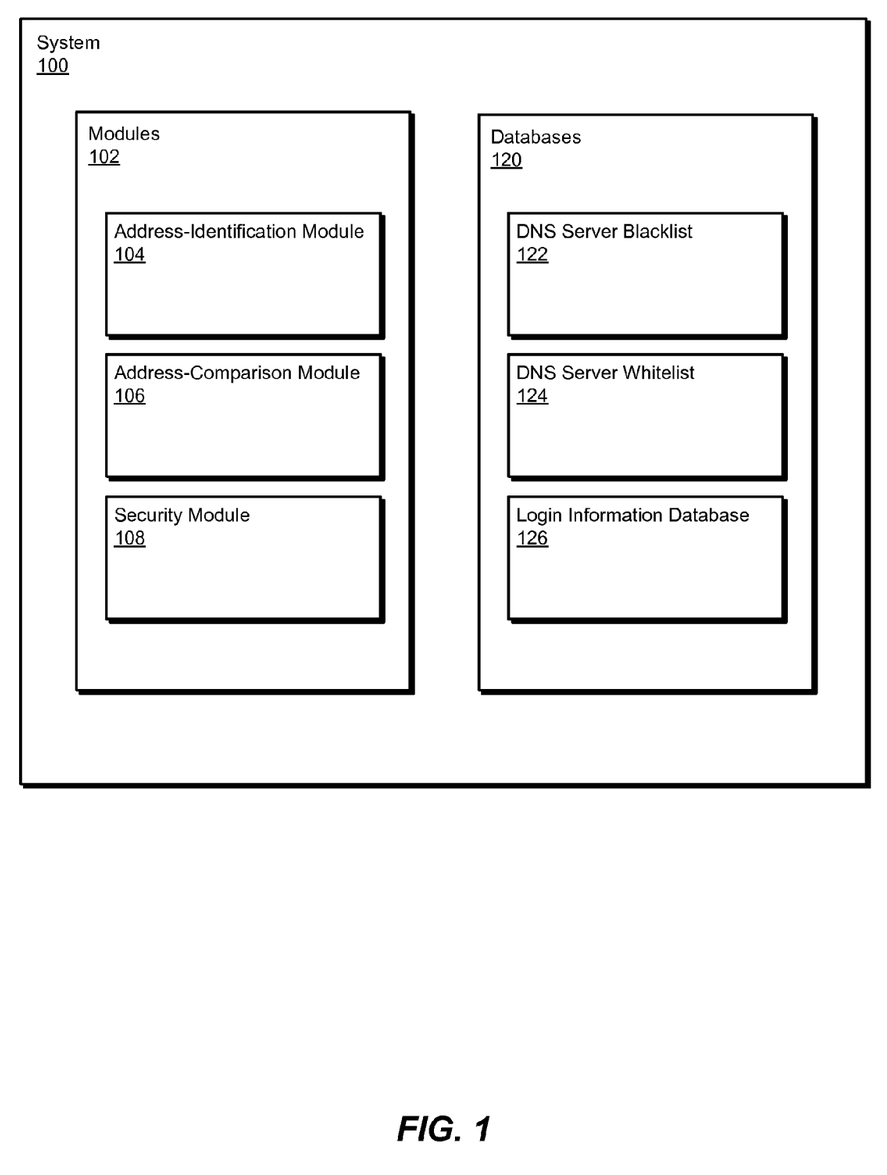
FIG. 1 is a block diagram of an exemplary system for detecting the insertion of poisoned DNS server addresses into DHCP servers.
Figure 2:
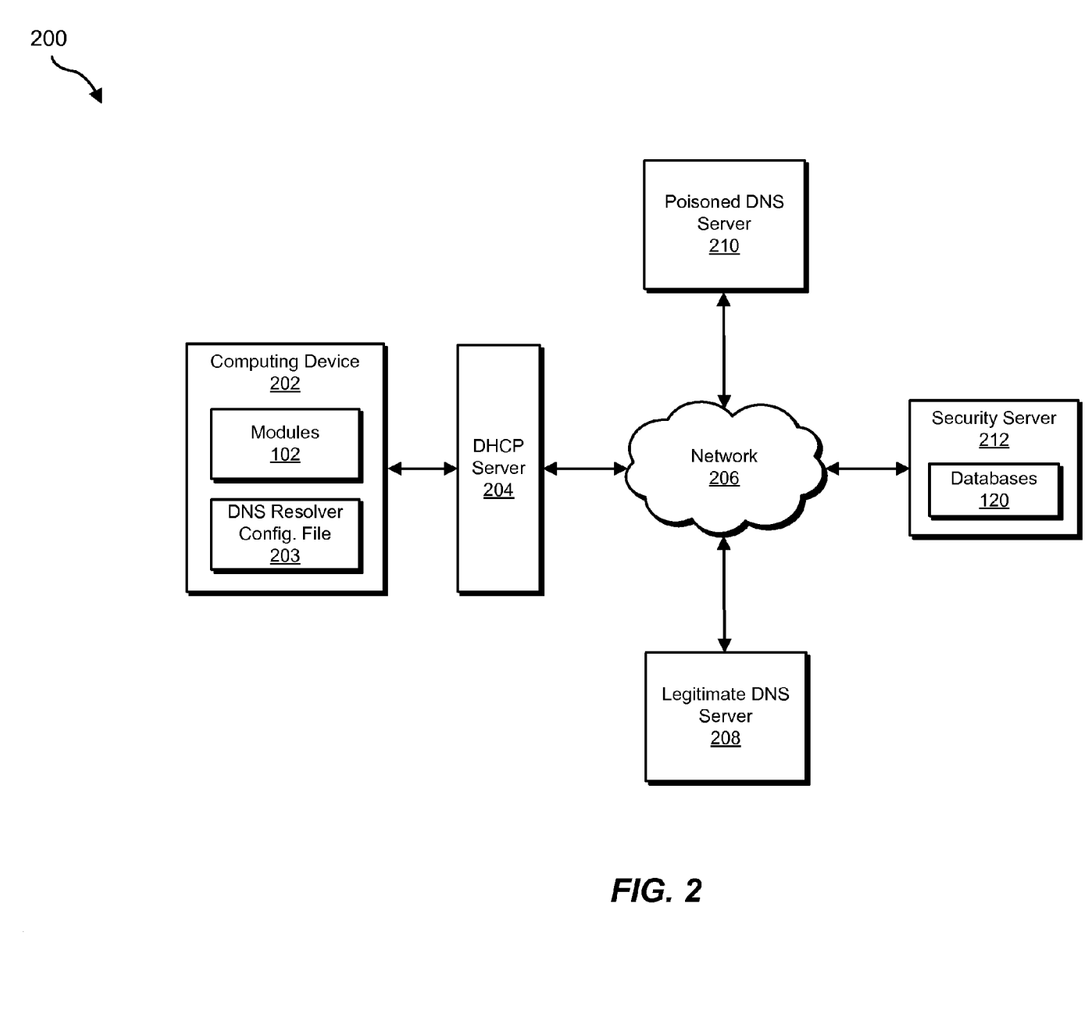
FIG. 2 is a block diagram of an exemplary system for detecting the insertion of poisoned DNS server addresses into DHCP servers.

The following will provide, with reference to FIGS. 1-2, detailed descriptions of exemplary systems for detecting the insertion of poisoned DNS server addresses into DHCP servers. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting the insertion of poisoned DNS server addresses into DHCP servers. As illustrated in this figure, exemplary system 100 may include one or more modules 102 for performing one or more tasks. For example, and as will be explained in greater detail below, exemplary system 100 may include an address-identification module 104 programmed to identify DNS server addresses provided by DHCP servers. Exemplary system 100 may also include an address-comparison module 106 programmed to determine whether a DNS server address provided by a DHCP server differs from a prior DNS server address provided by the DHCP server.

In addition, and as will be described in greater detail below, exemplary system 100 may include a security module 108 programmed to: 1) determine whether a DNS server located at the DNS server address provided by the DHCP server represents a potential security risk and then, if so, 2) perform a security operation in an attempt to remedy the potential security risk. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent portions of an operating system or software modules stored and configured to run on one or more computing devices, such as the devices illustrated in FIG. 2 (e.g., computing device 202 and/or security server 212), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, and as will be explained in greater detail below, databases 120 may include a DNS server blacklist 122 that identifies known rogue or poisoned DNS servers. Databases 120 may also include a DNS server whitelist 124 that identifies known legitimate DNS servers. In some examples, databases 120 may also include a login information database 126 that contains default or user-supplied login information for accessing various DHCP servers.

Databases 120 in FIG. 1 may represent a portion of one or more computing devices. For example, databases 120 may represent a portion of computing device 202 and/or security server 212 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as computing device 202 and/or security server 212 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of an exemplary system 200 in FIG. 2. As shown in FIG. 2, exemplary system 200 may include a computing device 202 in communication with a DHCP server 204. In one embodiment, and as will be described in greater detail below, modules 102 from FIG. 1 may program computing device 202 to: 1) identify a DNS server address (such as an IP address for poisoned DNS server 210) provided by a DHCP server (such as DHCP server 204), 2) determine that the DNS server address provided by the DHCP server differs from a prior DNS server address (such as an IP address for legitimate DNS server 208) provided by the DHCP server, 3) determine, due at least in part to the DNS server address differing from the prior DNS server address, that a DNS server (such as poisoned DNS server 210) located at the DNS server address provided by the DHCP server represents a potential security risk, and then 4) perform a security operation in an attempt to remedy the potential security risk (by, e.g., preventing computing device 202 from communicating with poisoned DNS server 210 and/or adding the IP address for poisoned DNS server 210 to a blacklist stored on security server 212).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

DHCP server 204 generally represents any type or form of computing device that is capable of responding to DHCP requests. Examples of DHCP server 204 include, without limitation, residential and enterprise gateways, such as cable and DSL modems, firewalls, network switches, routers, wireless access points, or the like.

Network 206 generally represents any medium or architecture capable of facilitating communication or data transfer.

Figure 6:
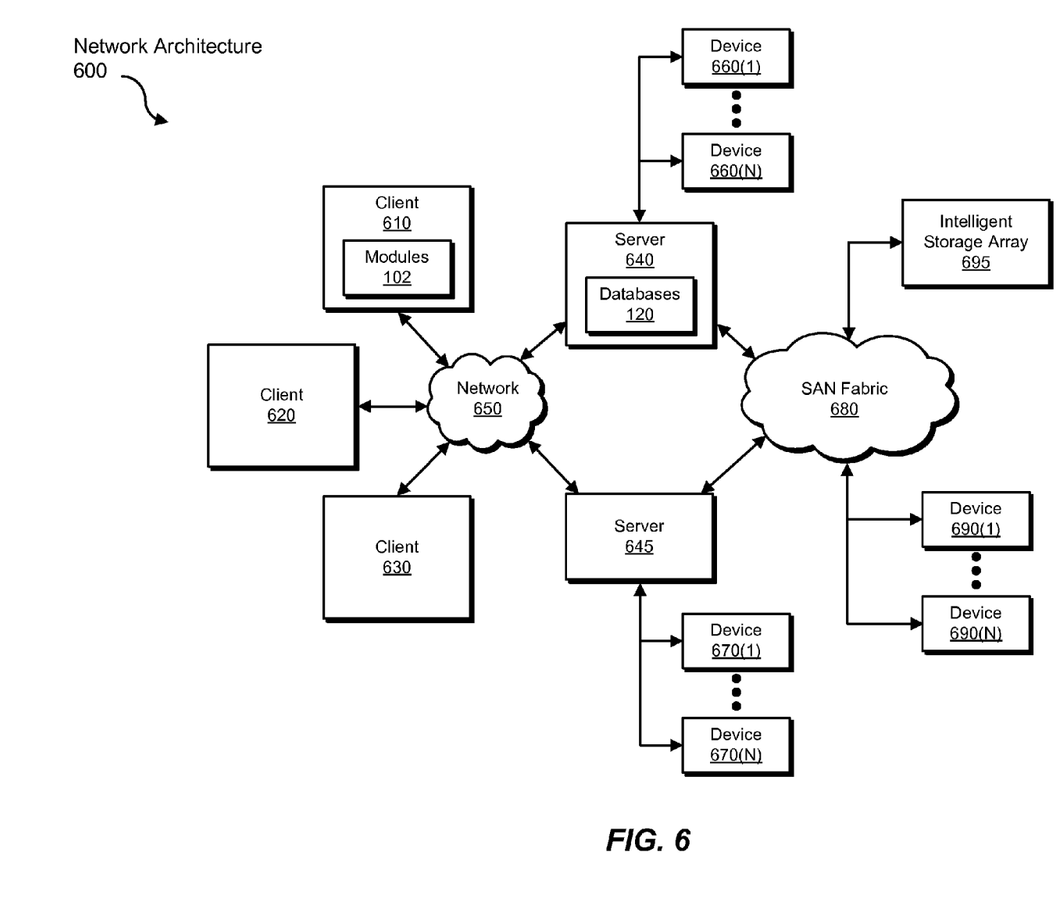
FIG. 6 is a block diagram of an exemplary computing network capable of implementing one or more of the embodiments described and/or illustrated herein.

Examples of network 206 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 206 may facilitate communication or data transfer using wireless or wired connections.

Security server 212 generally represents any type or form of computing device that is capable of performing, or storing or serving information relating to, various security operations. Examples of security server 212 include, without limitation, application servers and database servers configured to provide various database services and/or run certain software applications.

Figure 3:
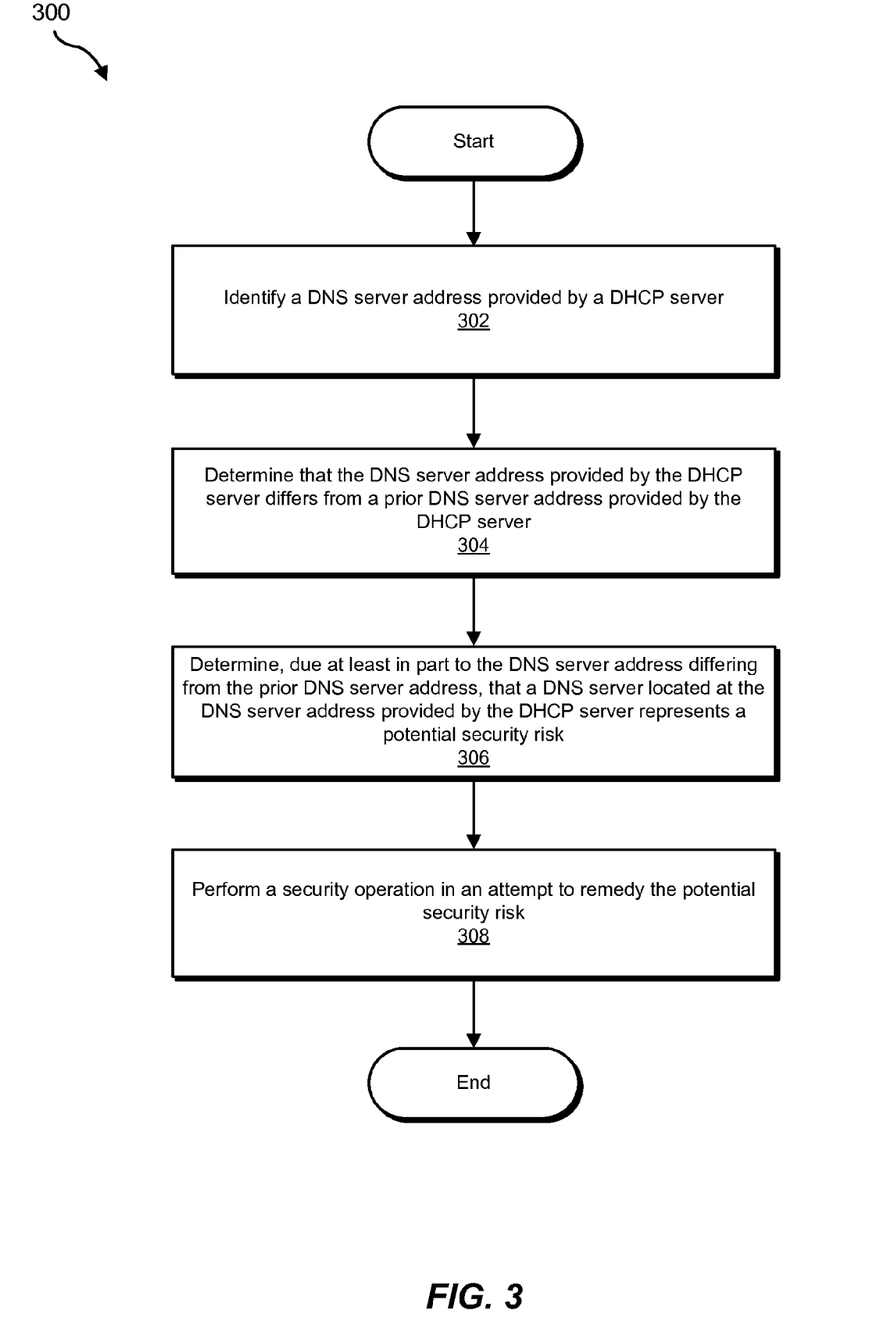
FIG. 3 is a flow diagram of an exemplary method for detecting the insertion of poisoned DNS server addresses into DHCP servers.

FIG. 3 is a flow diagram of an exemplary computer-implemented method 300 for detecting the insertion of poisoned DNS server addresses into DHCP servers. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a DNS server address provided by a DHCP server. For example, address-identification module 104 in FIG. 1 may, as part of computing device 202 in FIG. 2, identify a DNS server address provided by DHCP server 204. As detailed above, DHCP server 204 may, in some examples, represent a residential or enterprise gateway. For example, DHCP server 204 may represent a cable or DSL modem, a firewall, a network switch, a router, a wireless access point, or the like.

Address-identification module 104 may perform step 302 in a variety of ways. In one example, address-identification module 104 may identify a DNS server address provided by DHCP server 204 by: 1) issuing a DHCP request to DHCP server 204 and then 2) receiving a DNS server address from DHCP server 204 in response to the DHCP request. In some examples, address-identification module 104 may issue DHCP requests on a periodic basis in order to continually monitor the security state of computing device 202.

As detailed above, one or more of modules 102 may represent a portion of an operating system running on computing device 202 and/or security software installed on computing device 202. As such, address-identification module 104 may issue DHCP requests to DHCP server 204 as part of an operating system or security software installed on computing device 202.

In an additional example, address-identification module 104 may identify a DNS server address provided by a DHCP server by: 1) directly accessing the DHCP server and then 2) retrieving or extracting a DNS server address from the DHCP server. For example, address-identification module 104 in FIG. 1 may, as part of computing device 202 in FIG. 2, establish an HTTP connection with DHCP server 204. Address-identification module 104 may then log into DHCP server 204 using login information provided by a user of computing device 202 (such as, e.g., a user name and password created by a user of computing device 202 during initial setup of DHCP server 204).

Alternatively, address-identification module 104 may, upon establishing an HTTP connection with DHCP server 204, log into DHCP server 204 using default login information associated with DHCP server 204. For example, in scenarios where a user of computing device 202 has yet to change the default password assigned to DHCP server 204, address-identification module 104 may, upon identifying the manufacturer name and model number of DHCP server 204, retrieve a default password for logging into DHCP server 204 from security server 212 in FIG. 2 (e.g., from login information database 126 on security server 212) and/or from various publicly available sources (such as http://www.defaultpassword.com).

Figure 4:
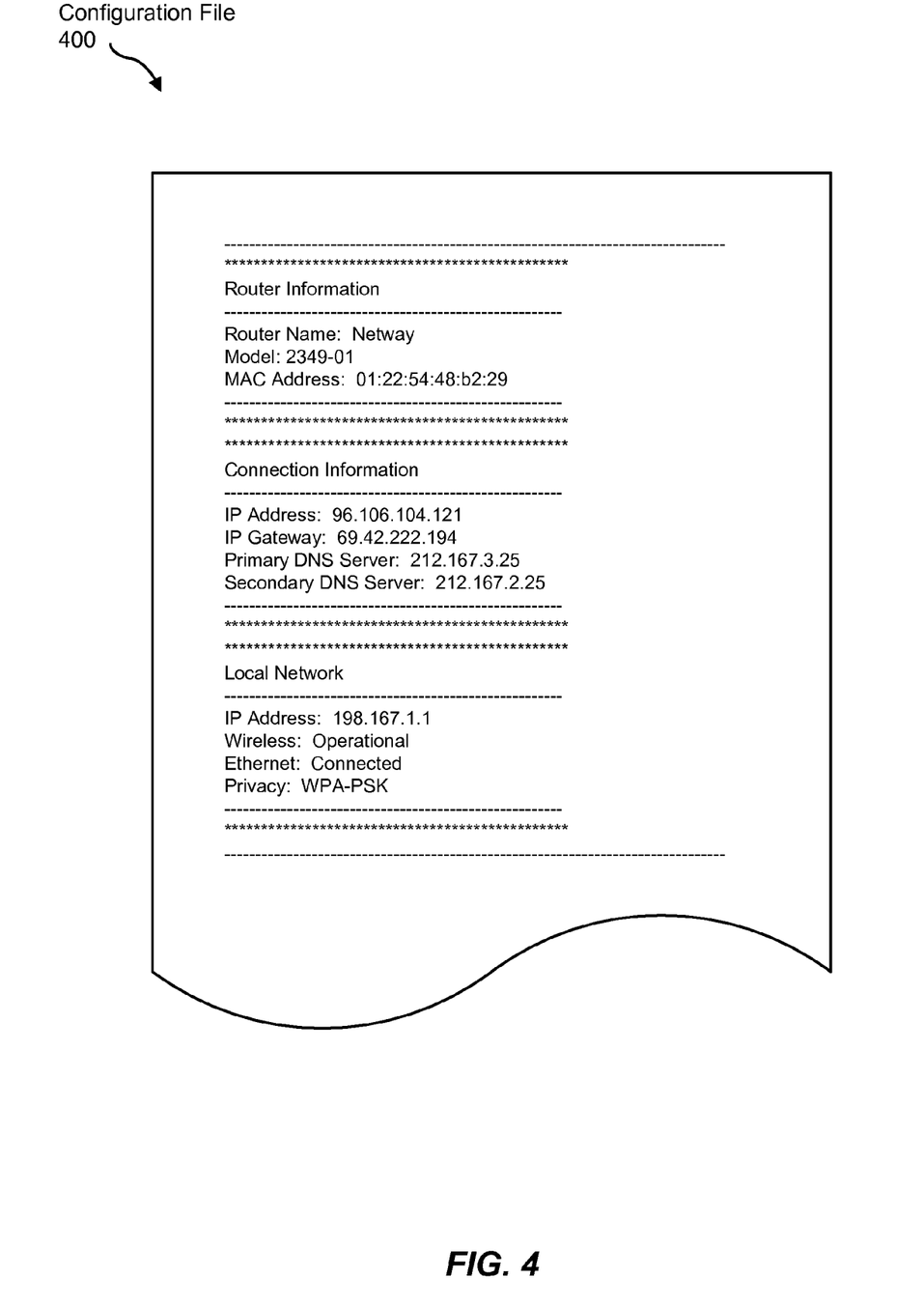
FIG. 4 is a block diagram of an exemplary configuration file obtained from a DHCP server.

Upon logging into DHCP server 204 (using, e.g., user-generated login information or default login information associated with DHCP server 204), address-identification module 104 may retrieve or extract a DNS server address from the DHCP server 204. Address-identification module 104 may retrieve DNS server addresses from DHCP servers in a variety of ways. In some examples, address-identification module 104 may engage in a device-specific dialog with the DHCP server in order to retrieve or extract the address of an upstream DNS server relied upon by the DHCP server. For example, address-identification module 104 may screen scrape specific text fields within an HTML file located on or generated by DHCP server 204. Alternatively, address identification module 104 may access or retrieve a specific file from DHCP server 204 that contains the desired information. For example, address-identification module 104 may retrieve a configuration file 400 in FIG. 4 from DHCP server 204. As illustrated in FIG. 4, configuration file 400 may contain information that identifies, among other items, the IP address of an upstream DNS server utilized by DHCP server 204.

Returning to FIG. 3, at step 304 the systems described herein may determine that the DNS server address provided by the DHCP server in step 302 differs from a prior DNS server address provided by the DHCP server. For example, address-comparison module 106 in FIG. 1 may, as part of computing device 202 in FIG. 2, determine that a DNS server address provided by DHCP server 204 differs from a prior DNS server address provided by DHCP server 204.

Address-comparison module 106 may perform step 304 in a variety of ways. For example, address-comparison module 106 may compare the DNS server address provided by DHCP server 204 in step 302 with a DNS server address currently in use by computing device 202 and/or stored in a local log file created and stored on computing device 202.

At step 306, the systems described herein may determine, due at least in part to the DNS server address differing from the prior DNS server address provided by the DHCP server, that a DNS server located at the DNS server address provided by the DHCP server represents a potential security risk. For example, since Internet Service Providers ("ISPs") and enterprises infrequently change DNS servers, security module 108 in FIG. 1 may, as part of computing device 202 in FIG. 2, determine that a DNS server (such as poisoned DNS server 210 in FIG. 2) located at the DNS server address provided by DHCP server 204 in step 302 represents a potential security risk if the new DNS server address differs from a prior DNS server address previously provided by DHCP server 204 (such as the IP address for legitimate DNS server 208).

Security module 108 may perform step 306 in a variety of ways. In one example, security module 108 may determine that a DNS server located at the new DNS server address provided by the DHCP server in step 302 represents a potential security risk if this DNS server address is listed on a DNS server blacklist and/or is not listed on a DNS server whitelist. For example, security module 108 may query security server 212 to determine whether the DNS server address provided by DHCP server 204 in step 302 is identified on a DNS server blacklist 122 and/or a DNS server whitelist 124 stored within databases 120 on security server 212. As detailed above, DNS server blacklist 122 may identify known poisoned or rogue DNS servers. Similarly, DNS server whitelist 124 may identify known legitimate DNS servers. In some examples, a security software provider may create DNS server whitelist 124 by requiring ISPs to register DNS servers (and/or DNS server changes) with the security software provider.

In an additional embodiment, security module 108 may determine that a DNS server located at the DNS server address provided by the DHCP server in step 302 represents a potential security risk by determining that a communication latency associated with the DNS server exceeds a predetermined threshold. For example, because the third-party observance of IP traffic may inject an observable delay, security module 108 may employ various DNS administration tools (such as the Domain Information Groper tool, or "DIG") in order to determine whether the communication latency associated with a particular DNS server exceeds a maximum acceptable threshold (i.e., a threshold that, when exceeded, indicates the potential presence of third-party observance of IP traffic). In this example, if security module 108 determines that the communication latency associated with a particular DNS server exceeds this maximum acceptable threshold, then security module 108 may determine that the DNS server in question potentially represents a poisoned or rogue DNS server.

In some examples, security module 108 may determine that a DNS server located at the DNS server address provided by the DHCP server in step 302 represents a potential security risk if security module 108 detects the modification of a DNS resolver configuration file (such as "resolv.config") stored on computing device 202 in FIG. 2. For example, security module 108 may continually monitor a local DNS resolver configuration file 203 stored on computing device 202. If security module 108 determines that this file has been modified, and that this file now references a new DNS server address that differs from a prior DNS server address previously provided by DHCP server 204, then security module 108 may determine that the DNS server located at the new DNS server address represents a potential security risk.

Returning to FIG. 3, at step 308 the systems described herein may perform a security operation in an attempt to remedy the potential security risk. For example, security module 108 may prevent computing device 202 from communicating with a DNS server (such as poisoned DNS server 210) located at the DNS server address provided by DHCP server 204 in step 302.

Security module 108 may perform a variety of different security operations in step 308 in an attempt to remedy the potential security risk. For example, security module 108 may: 1) prevent computing device 202 from communicating with poisoned DNS server 210, 2) delete the IP address of poisoned DNS server 210 from DHCP server 204, 3) replace the IP address of poisoned DNS server 210 (either on computing device 202 or DHCP server 204) with the IP address of a legitimate DNS server (such as legitimate DNS server 208), 4) add the IP address of poisoned DNS server 210 to a DNS server blacklist (such as DNS server blacklist 122), 5) inform government authorities that poisoned DNS server 210 represents a potential security risk, and/or 6) modify the login information required to access DHCP server 204 (by, e.g., changing the default or user-generated password required to access DHCP server 204).

As detailed above, by monitoring the DNS server addresses provided by local DHCP servers, the systems and methods described herein may enable endpoint security software to successfully detect the insertion of poisoned DNS server addresses. As such, these systems and methods may protect end users from attacks (such as phishing attempts) that utilize poisoned or rogue DNS servers.

Figure 5:
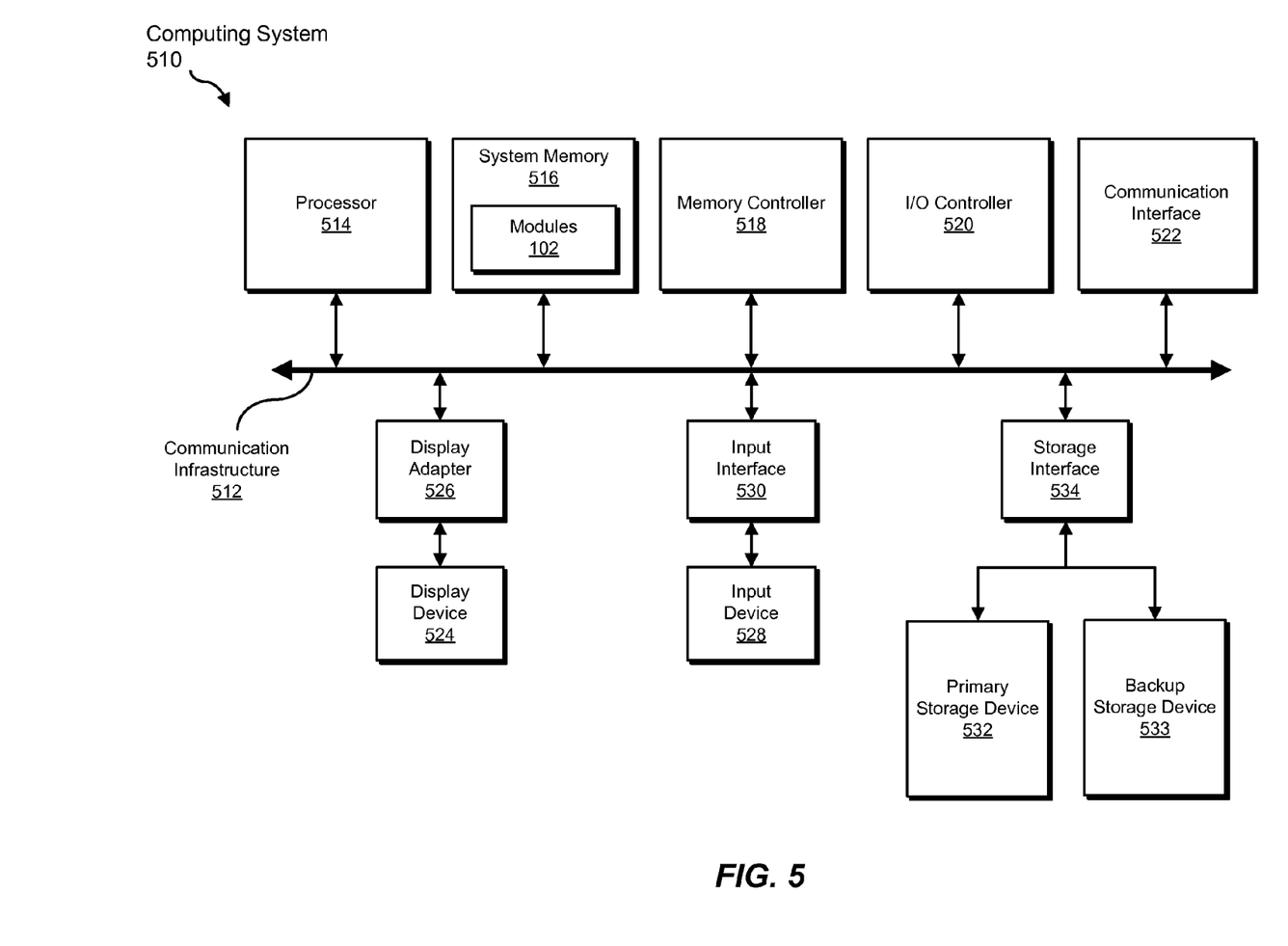
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, determining, performing, issuing, receiving, accessing, retrieving, preventing, deleting, replacing, adding, informing, and modifying steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, determining, performing, issuing, receiving, accessing, retrieving, preventing, deleting, replacing, adding, informing, and modifying.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, determining, performing, issuing, receiving, accessing, retrieving, preventing, deleting, replacing, adding, informing, and modifying steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, determining, performing, issuing, receiving, accessing, retrieving, preventing, deleting, replacing, adding, informing, and modifying steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, determining, performing, issuing, receiving, accessing, retrieving, preventing, deleting, replacing, adding, informing, and modifying steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, determining, performing, issuing, receiving, accessing, retrieving, preventing, deleting, replacing, adding, informing, and modifying steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include portions of system 100 from FIG. 1. For example, client system 610 may include modules 102 from FIG. 1 and server 640 may include databases 120.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, determining, performing, issuing, receiving, accessing, retrieving, preventing, deleting, replacing, adding, informing, and modifying steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method (such as exemplary method 300 in FIG. 3) for detecting the insertion of poisoned DNS server addresses into DHCP servers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, security module 108 in FIG. 1 may transform a characteristic of security server 212 by storing information within databases 120 that identifies poisoned and/or rogue DNS servers.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting the insertion of poisoned Domain Name System ("DNS") server addresses into Dynamic Host Configuration Protocol ("DHCP") servers, at least a portion of the method being performed by a client computing device comprising at least one processor, the method comprising:
    monitoring, at the client computing device, a DHCP server that provides DHCP services to the client computing device;
    identifying, by monitoring the DHCP server at the client computing device, a DNS server address provided by the DHCP server to the client computing device;
    determining, at the client computing device, that the DNS server address provided by the DHCP server differs from a prior DNS server address that was previously provided to the client computing device by the same DHCP server;
    determining, at the client computing device due at least in part to the DNS server address differing from the prior DNS server address, that a DNS server located at the DNS server address provided by the DHCP server represents a potential security risk;
    performing, at the client computing device, a security operation in an attempt to remedy the potential security risk.

2. The method of claim 1, further comprising, prior to identifying the DNS server address provided by the DHCP server, issuing a DHCP request to the DHCP server.

3. The method of claim 2, wherein issuing the DHCP request to the DHCP server comprises periodically issuing the DHCP request to the DHCP server.

4. The method of claim 2, wherein identifying the DNS server address provided by the DHCP server comprises receiving, in response to the DHCP request, the DNS server address from the DHCP server.

5. The method of claim 1, wherein identifying the DNS server address provided by the DHCP server comprises:
    accessing the DHCP server;
    retrieving the DNS server address from the DHCP server.

6. The method of claim 5, wherein accessing the DHCP server comprises at least one of:
    accessing the DHCP server using login information provided by a user of the client computing device;
    accessing the DHCP server using default login information assigned to the DHCP server.

7. The method of claim 1, wherein determining that the DNS server located at the DNS server address provided by the DHCP server represents a potential security risk further comprises at least one of:
    determining that the DNS server address is listed on a DNS server blacklist;
    determining that the DNS server address is not listed on a DNS server whitelist;
    determining that a communication latency associated with the DNS server exceeds a predetermined threshold;
    detecting modification of a DNS resolver configuration file on the client computing device.

8. The method of claim 1, wherein the DHCP server comprises a residential gateway.

9. The method of claim 1, wherein performing the security operation comprises at least one of:
    preventing the client computing device from communicating with the DNS server;
    deleting the DNS server address from the DHCP server;
    replacing the DNS server address with a legitimate DNS server address;
    adding the DNS server address to a DNS server blacklist;
    informing a government authority that the DNS server represents a potential security risk;
    modifying login information required to access the DHCP server.

10. A system for detecting the insertion of poisoned Domain Name System ("DNS") server addresses into Dynamic Host Configuration Protocol ("DHCP") servers, the system comprising:
    an address-identification module programmed to cause a client computing device to:
        monitor a DHCP server that provides DHCP services to the client computing device;
        identify, by monitoring the DHCP server, a DNS server address provided by the DHCP server to the client computing device;
    an address-comparison module programmed to cause the client computing device to determine that the DNS server address provided by the DHCP server differs from a prior DNS server address that was previously provided to the client computing device by the same DHCP server;

a security module programmed to cause the client computing device to:
  determine, due at least in part to the DNS server address differing from the prior DNS server address, that a DNS server located at the DNS server address provided by the DHCP server represents a potential security risk;
  perform a security operation in an attempt to remedy the potential security risk;
at least one processor and a memory device configured to execute the address-identification module, the address-comparison module, and the security module.

11. The system of claim 10, wherein the address-identification module is further programmed to issue a DHCP request to the DHCP server.

12. The system of claim 11, wherein the address-identification module issues the DHCP request to the DHCP server by periodically issuing the DHCP request to the DHCP server.

13. The system of claim 11, wherein the address-identification module identifies the DNS server address provided by the DHCP server by receiving the DNS server address from the DHCP server in response to the DHCP request.

14. The system of claim 10, wherein the address-identification module identifies the DNS server address provided by the DHCP server by:
  accessing the DHCP server;
  retrieving the DNS server address from the DHCP server.

15. The system of claim 14, wherein the address-identification module accesses the DHCP server by at least one of:
  accessing the DHCP server using login information provided by a user of the client computing device;
  accessing the DHCP server using default login information assigned to the DHCP server.

16. The system of claim 10, wherein the security module determines that the DNS server located at the DNS server address provided by the DHCP server represents a potential security risk by at least one of:
  determining that the DNS server address is listed on a DNS server blacklist;
  determining that the DNS server address is not listed on a DNS server whitelist;
  determining that a communication latency associated with the DNS server exceeds a predetermined threshold;
  detecting modification of a DNS resolver configuration file on the client computing device.

17. The system of claim 10, wherein the DHCP server comprises a residential gateway.

18. The system of claim 10, wherein the security module performs the security operation by at least one of:
  preventing the client computing device from communicating with the DNS server;
  deleting the DNS server address from the DHCP server;
  replacing the DNS server address with a legitimate DNS server address;
  adding the DNS server address to a DNS server blacklist;
  informing a government authority that the DNS server represents a potential security risk;
  modifying login information required to access the DHCP server.

19. A non-transitory computer-readable medium comprising computer-executable instructions that, when executed by at least one processor of a client computing device, cause the client computing device to:
  monitor, at the client computing device, a Dynamic Host Configuration Protocol ("DHCP") server that provides DHCP services to the client computing device;
  identify, by monitoring the DHCP server at the client computing device, a Domain Name System ("DNS") server address provided by the DHCP server to the client computing device;
  determine, at the client computing device, that the DNS server address provided by the DHCP server differs from a prior DNS server address that was previously provided to the client computing device by the same DHCP server;
  determine, at the client computing device due at least in part to the DNS server address differing from the prior DNS server address, that a DNS server located at the DNS server address provided by the DHCP server represents a potential security risk;
  perform, at the client computing device, a security operation in an attempt to remedy the potential security risk.

20. The computer-readable medium of claim 19, wherein the DHCP server comprises a residential gateway.

* * * * *